United States Patent
Cech et al.

(10) Patent No.: US 8,477,343 B2
(45) Date of Patent: Jul. 2, 2013

(54) METHOD AND SYSTEM FOR PRINT QUEUE MANAGEMENT

(75) Inventors: Peter Cech, Pittsford, NY (US); Daniel Rupe, Fairport, NY (US); Matthew Lombardo, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 1030 days.

(21) Appl. No.: 12/337,082

(22) Filed: Dec. 17, 2008

(65) Prior Publication Data

US 2010/0149584 A1 Jun. 17, 2010

(51) Int. Cl.
*G06F 3/12* (2006.01)

(52) U.S. Cl.
USPC ......... 358/1.15; 358/1.13; 709/220; 709/223; 709/227; 709/238; 710/104; 714/57; 715/745; 719/328

(58) Field of Classification Search
USPC ...... 358/1.15, 1.13, 296; 379/88.19; 704/270; 709/220, 223, 227, 230, 238; 710/104, 8; 719/319, 321, 328; 714/48, 57; 715/745
See application file for complete search history.

(56) References Cited

U.S. PATENT DOCUMENTS

| | | | | |
|---|---|---|---|---|
| 5,287,194 A | * | 2/1994 | Lobiondo | 358/296 |
| 5,764,911 A | * | 6/1998 | Tezuka et al. | 709/223 |
| 5,943,649 A | * | 8/1999 | Fado et al. | 704/270 |
| 6,184,996 B1 | * | 2/2001 | Gase | 358/1.15 |
| 6,301,012 B1 | * | 10/2001 | White et al. | 358/1.15 |
| 6,434,626 B1 | * | 8/2002 | Prakash et al. | 709/238 |
| 6,687,018 B1 | | 2/2004 | Leong et al. | |
| 6,788,429 B1 | * | 9/2004 | Clough et al. | 358/1.15 |
| 7,187,461 B2 | | 3/2007 | Schlonski et al. | |
| 7,454,482 B2 | | 11/2008 | Barnard et al. | |
| 2001/0014145 A1 | * | 8/2001 | Kamel et al. | 379/88.19 |
| 2002/0145627 A1 | * | 10/2002 | Whitmarsh et al. | 345/745 |
| 2002/0196463 A1 | * | 12/2002 | Schlonski et al. | 358/1.15 |
| 2003/0005097 A1 | * | 1/2003 | Barnard et al. | 709/223 |
| 2003/0005100 A1 | * | 1/2003 | Barnard et al. | 709/223 |
| 2004/0036908 A1 | * | 2/2004 | Yagita et al. | 358/1.15 |
| 2006/0090172 A1 | * | 4/2006 | Sedky et al. | 719/328 |

* cited by examiner

*Primary Examiner* — King Poon
*Assistant Examiner* — David S Cammack
(74) *Attorney, Agent, or Firm* — Gibb & Riley, LLC

(57) ABSTRACT

A method and system suitable for use with a plurality of multifunction devices (MFDs) for managing one or more print queues associated with the plurality of MFDs, the system including a user interface application for permitting users to electronically communicate with a queue managing service (QMS); wherein the QMS automatically detects, identifies, and analyzes the one or more print queues associated with the plurality of MFDs in order to provide a status of the plurality of MFDs and continuously notify the users of the updates relating to the one or more print queues.

17 Claims, 3 Drawing Sheets

METHOD AND SYSTEM FOR PRINT QUEUE MANAGEMENT

BACKGROUND

1. Field of the Related Art

The present disclosure relates to printers, and more particularly, to a method and system for managing a plurality of print queues of a plurality of multifunction devices (MFDs).

2. Background of the Related Art

The concept of "network printing," in which any of a plurality of computers submit digital data to one of any number of printers over a network, is well known. The administration of printing devices in a network environment is typically a tedious and time consuming task for network administrators. In particular, for large and complex network environments having several local servers, there may be a large number of printers distributed throughout the network. Network administrators must not only install new printing devices on the network, but they must also create and manage the print queues associated with the printing devices and facilitate network users connecting to and utilizing the printing devices.

A conventional printing system uses a client/server architecture that usually includes three primary components. These components include (i) a client, (ii) a server, and (iii) an output device. The client conveys print and management requests to the server and receives responses from the server that arise in response to the submitted requests. The server receives these requests from the client, performs the required actions for each request, and returns the responses to the client. One such request from a client is a print request, i.e., a request to print one or more copies of one or more documents, with the printed pages output using one or more features. A print request may represent a collection of one or more documents to be printed, as well as instructions for printing. The server organizes the documents indicated in the print request submitted by the client into a print job. The server then sends the print job and any associated job control commands to the output device.

The output device is a physical device, or hardware, that is capable of rendering images of documents and producing hard copy output of the print jobs received from the server. The output device can then return responses to the server regarding its current state or the status of the received print jobs. The output device is commonly a printer. However, the output device may also be any type of multifunction device (MFD).

In general, a MFD operates as a plurality of different imaging devices, including, but not limited to, a printer, copier, fax machine, and/or scanner. In recent years the basic office copier has evolved into what can be referred to as a MFD. With digital technology, a machine with the basic outward appearance of a traditional copier can perform at least the additional functions of printing documents submitted in digital form over a network, sending and receiving messages via facsimile, recording hard-copy original images in digital form and sending the resulting data over a network, such as in electronic mail and/or recording hard-copy original images in digital form on a compact disc or equivalent medium.

In the area of digital printing and copying, there has been a growth in demand for MFDs. Such MFD devices may assume the form of an arrangement in which a single print engine (e.g., xerographic or thermal ink jet print engine) is coupled with a plurality of different image input devices (or "services"), with such devices being adapted to produce image related information for use by the printer or transmitted over a network. The image related information, in one example, could have its origin in video facsimile signals, microfilm, data processing information, light scanning platens for full size documents, aperture cards, and microfiche. MFDs provide a broader range of functionality than traditional single-function devices, such as dedicated printers, copiers, and scanners. As a result, since MFDs are universally used, it would be useful to track and manage print queues associated with MFDs.

For example, in an office environment, a typical user has a desktop computer that has some set of printers installed on it. These printers may or may not be the ones that the user most often prints to. Assistance from other users/administrators may yield additional printers being added onto their system which the user does not use, but is hesitant to delete. The list of printers that can eventually appear on a user's system can be lengthy and confusing. Knowing which ones are actually necessary is not always clear. Also, some printers may be added to the network while others are removed. Unless the user specifically keeps track of these new resources, or verifies the existence of the old ones, he/she may not become aware of their status. In fact, the user can actually waste a significant amount of time trying to print to a printer that does not exist or to a print queue that is overloaded.

Once a print queue has been created and configured for a particular printing device, network users may begin utilizing the printing device by locating and connecting to the desired print queue, and installing any necessary print drivers. However, searching for the desired print queue often requires the network user to search lists of print queues on multiple network servers. Thus, in networking environments employing a large number of servers, finding a desired print queue can be confusing and very time consuming.

As a result, in conventional document printing systems, a user must specify the physical printer to be used to print a specific job or print a document. Therefore, the user must know the attributes of every available physical printer on the network in order to decide which printer would best print the desired document(s). Additionally, if new printers are added to the network, each user must ascertain the capabilities of each new printer and the print address for each newly added printer, assuming the user even knows that new printers have been added. Thus, newly added printers can be available for quite some time without being used at their full capacity and old printers may have been removed or incorporated with additional functions not known to the users.

Consequently, current systems lack the capability to effectively inform a plurality of users using a plurality of MFDs the status of the print queues of the plurality of MFDs. The present disclosure is intended to overcome the drawbacks of other methods by providing for a system and method for managing one or more print queues associated with the plurality of MFDs.

SUMMARY

The present disclosure provides a suitable printing system for use with a plurality of multifunction devices (MFDs) for managing one or more print queues associated with the plurality of MFDs, the system including a user interface application for enabling users to electronically communicate with a queue managing service (QMS); wherein the QMS automatically detects, identifies, and analyzes the one or more print queues associated with the plurality of MFDs in order to provide a status of the plurality of MFDs and continuously notify the users of the updates relating to the one or more print queues.

The present disclosure also provides a method for managing one or more print queues associated with a plurality of MFDs suitable for use in a printing system, the method including the steps of enabling users to electronically communicate with a queue managing service (QMS) via a user interface application; automatically detecting the one or more print queues associated with the plurality of MFDs; automatically identifying the one or more print queues associated with the plurality of MFDs; and automatically analyzing the one or more print queues associated with the plurality of MFDs in order to provide a status of the plurality of MFDs and continuously notify the users of the updates relating to the one or more print queues.

The present disclosure also provides a computer-readable medium which stores programmable instructions configured for being executed by at least one processor for performing the methods described herein according to the present disclosure. The computer-readable medium can include flash memory, CD-ROM, a hard drive, etc.

BRIEF DESCRIPTION OF THE DRAWINGS

Various embodiments of the present disclosure will be described herein below with reference to the figures wherein.

DETAILED DESCRIPTION

Figure 1:
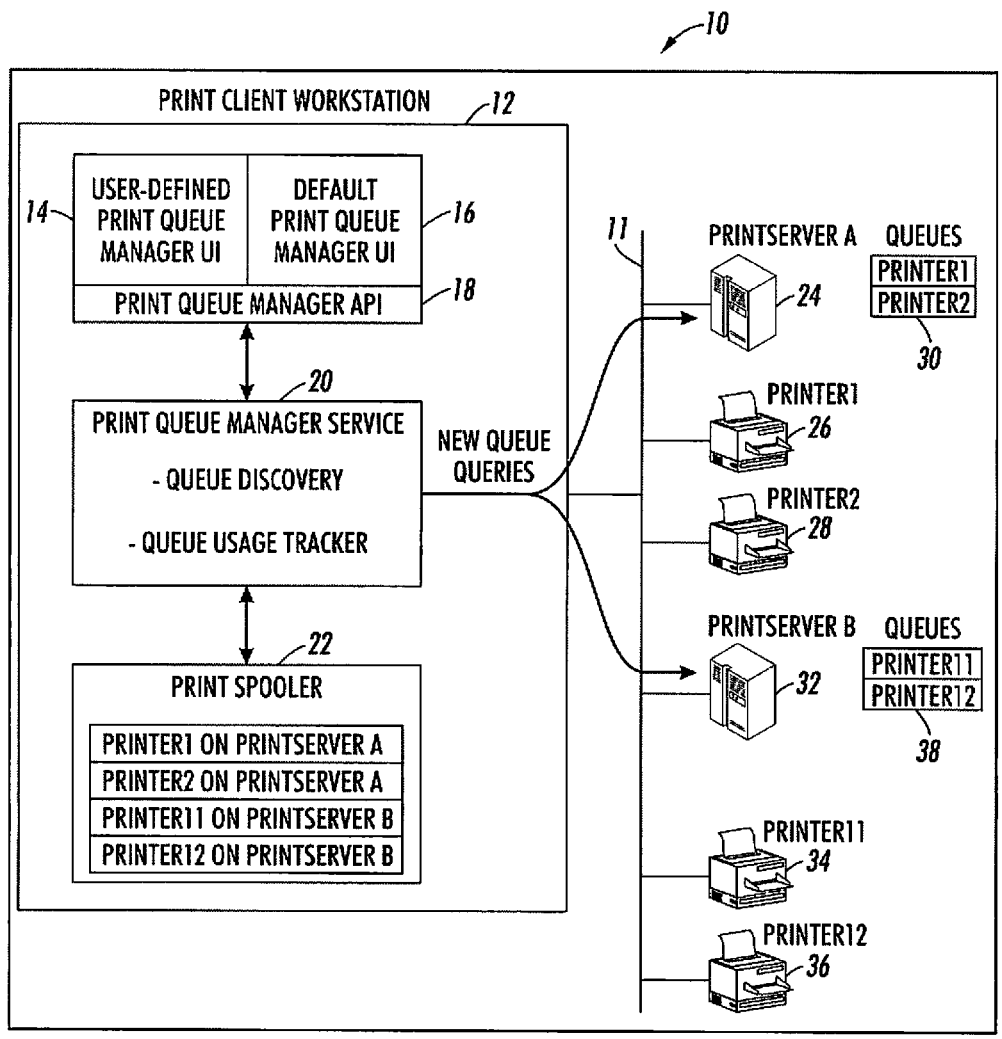
FIG. 1 is a schematic diagram of a print queue manager service, in accordance with the present disclosure.

The present disclosure proposes a service to aid one or more users to efficiently manage a plurality of printers or MFDs on a printing system. The present disclosure proposes a service which runs, for example, in the background of a desktop workstation to perform various tasks. These tasks may include, but are not limited to, the following: (i) "Queue Discovery," which is a service that periodically discovers new print queues that are available on the network and can notify the user that they are available for installation. (ii) "Queue Usage Tracking," which is a service that maintains metrics on the installed queues and notifies the users of any print queue maintenance operations that should be performed. Such operations include, but are not limited to, changing the default system queue, and/or cleaning up queues that are no longer available or which are rarely used.

Furthermore, a software library may be provided, which utilizes an application programming interface (API) with the Print Queue Manager service and allows a user interface (UI) application to be created for interfacing to the Queue Manager Service. Through an application that utilizes this API, users are able to add and delete queues, and/or set and view queue properties. The UI application may also allow users to register for such events, such as, but not limited to: new queue discovered, installed queue no longer available, and/or default queue recommendations.

The term "print" is overloaded to mean sending the document to the printer through any one of a multitude of ways. Moreover, the term "printer" can refer to any device that accepts text and graphic output from any type of computing device and transfers the information to any printable medium. A "printer" can refer to any type of xerographic, solid ink, liquid ink, cut sheet or web-based device used to print onto a wide array of printable media. The term "printer" as used herein encompasses any apparatus, such as a digital copier, bookmaking machine, facsimile machine, multi-function machine, etc. which performs a print outputting function for any purpose.

MFDs disclosed herein include both those that are "connected" and those that are "unconnected." An "unconnected" MFD does not have access to a network (e.g., the Internet). A "connected" MFD is normally connected via an Ethernet card or the like to a network. In the present embodiments, the MFD may be an unconnected MFD that is in operative communication with a wireless device, the wireless device being able to access a network. A connection between the multifunctional device and the wireless device is made through a two-way communication channel located on the multifunctional device.

The term "MFD" can refer to any machine that connects to either a computing device and/or network and performs one or more of the following functions: print, scan, copy, and/or fax. Digital copiers, fax machines, printers, and scanner combinations are all examples of MFDs. The term "MFD" can further refer to any hardware that combines several functions in one unit. For instance, an MFD can be a standalone printer or any type of standalone machine/device/apparatus/component. For example, an MFD can be one or more personal computers (PCs), a standalone printer, a standalone scanner, a mobile phone, an MP3 player, audio electronics, video electronics, GPS systems, televisions, recording and/or reproducing media (such as CDs, DVDs, camcorders, cameras, etc.) or any other type of consumer or non-consumer analog and/or digital electronics. Such consumer and/or non-consumer electronics can apply in any type of entertainment, communications, home, and/or office capacity. Thus, the term "MFDs" can refer to any type of electronics suitable for use with a circuit board and intended to be used by a plurality of individuals for a variety of purposes.

The term "storage" can refer to data storage. "Data storage" can refer to any article or material (e.g., a hard disk) from which information is capable of being reproduced, with or without the aid of any other article or device. "Data storage" can refer to the holding of data in an electromagnetic form for access by a computer processor. Primary storage is data in random access memory (RAM) and other "built-in" devices. Secondary storage is data on hard disk, tapes, and other external devices. "Data storage" can also refer to the permanent holding place for digital data, until purposely erased. "Storage" implies a repository that retains its content without power. "Storage" mostly means magnetic disks, magnetic tapes and optical discs (CD, DVD, etc.). "Storage" may also refer to non-volatile memory chips such as flash, Read-Only memory (ROM) and/or Electrically Erasable Programmable Read-Only Memory (EEPROM).

The term "print queue" can refer to a file (or set of files) which a print daemon uses so that applications that wish to use the printer do not have to wait until the print job they have sent is finished before they can continue. It also allows multiple users to share a printer and/or MFD. The term "print queue" can also refer to a software queue that sorts and orders incoming print jobs and/or storage space that holds output designated for the printer until the printer can receive it. Print queues can be paused or taken offline by one or more users of the printers and/or MFDs. The term "print queue" can also refer to a list of files that have been sent to a particular printer or MFD. The list may include the file currently printing and those files waiting to be printed. The term "print queue" can also refer to a prioritized list, maintained by an operating system, of the output from a computer system waiting on a spool file to be printed.

The term "user interface application" may refer to a method for providing simple yet extensible frameworks for developing user interface processes. The user interface application may be designed to enable the control flow and state management out of the user interface layer and into a user interface process layer. In other words, a user can access and interact with a display screen having a plurality of applications, the plurality of applications being translated from software code to visual interaction elements.

The term "queue managing service" may refer to any method of managing data received in a queue, such as, but not limited to, a print queue. The term "queue managing service" may also refer to the process by which the switch, or the network, or any decision-making entity, lines up data and/or the act, manner, or practice of managing queues and/or handling, supervision, or control of queues by any service provider.

Embodiments will be described below while referencing the accompanying figures. The accompanying figures are merely examples and are not intended to limit the scope of the present disclosure.

With reference to FIG. 1, there is presented a schematic diagram of a print queue manager service, in accordance with the present disclosure. The print queue management system 10 includes a print client workstation 12 having a print queue manager UI 14, a default print queue manager UI 16, a print queue manager API 18, a print queue manager service 20, and a print spooler 22. The print client workstation 12 is connected via a network bus 11 to a first print server 24, a first printer 26 (see PRINTER1), a second printer 28 (see PRINTER2), a second print server 32, a third printer 34 (see PRINTER11), and a fourth printer 36 (see PRINTER12). The first printer 26 and the second printer 28 have a shared queue 30 (see QUEUES for PRINTER1 and PRINTER2) configured on PrintServerA 28 and printers 34 and 36 have a shared queue 38 (see QUEUES for PRINTER11 and PRINTER21) on PrintServerB 32. Likewise, the print client workstation 12 has four queues configured on it which "point" to the shared queues 30, 38 on PrintServerA 28 and PrintServerB 32, respectively.

The print queue manager API 18 is in communication with the print queue manager service 20. The print queue manager service 20 is in communication with the print spooler 22. The print queue manager service 20 may include the tasks of "queue discovery" and "queue usage tracker," as described above. The print spooler 22 is a software service that gets a print job to the print server and/or software that intercepts a printjob on its way to the printer and sends it to a disk or memory (i.e., any type of storage device) where it can be held until the printer or MFD is ready to print. The one or more print queues may be stored on any type of memory device or storage device contemplated by one skilled in the art.

FIG. 1 illustrates the components associated with the print queue management system 10. The print queue manager service 20 is located on top of the client computer's print spooler 22. The print queue manager service 20 monitors the network and keeps track of newly added print queues. The print queue manager service 20 also tracks the status of currently installed queues and their usage. Along with the print queue manager service 20 are a print queue manager UI 14 and a default print queue manager UI 16. These are separate applications that interface with the print queue manager service 20 and allow the users to manage the print queues they have installed and receive notifications regarding the status of the print queues they have installed. Moreover, the print queue manager service 20 includes a default print queue manager UI 16 where users can develop their own UI.

The print queue manager service 20 runs, for example, in the background on a client workstation. The print queue manager service 20 silently goes out onto the network and locates shared print queues that have not been installed on the workstation. If the print queue manager service 20 locates one or more uninstalled print queues on the network, it keeps track of those queues and notifies the user at some point in time through either the print queue manager UI 14 or the default print queue manager UI 16. The scope of the print queue discovery may include all workstations on a subnet or be limited to print servers of queues that the client machine already has installed.

The print queue manager service 20 can also establish when installed print queues are no longer available for printing. The print queue manager service 20 would be able to track the print queues that have previously been available and then determine if they are no longer available.

Figure 2:
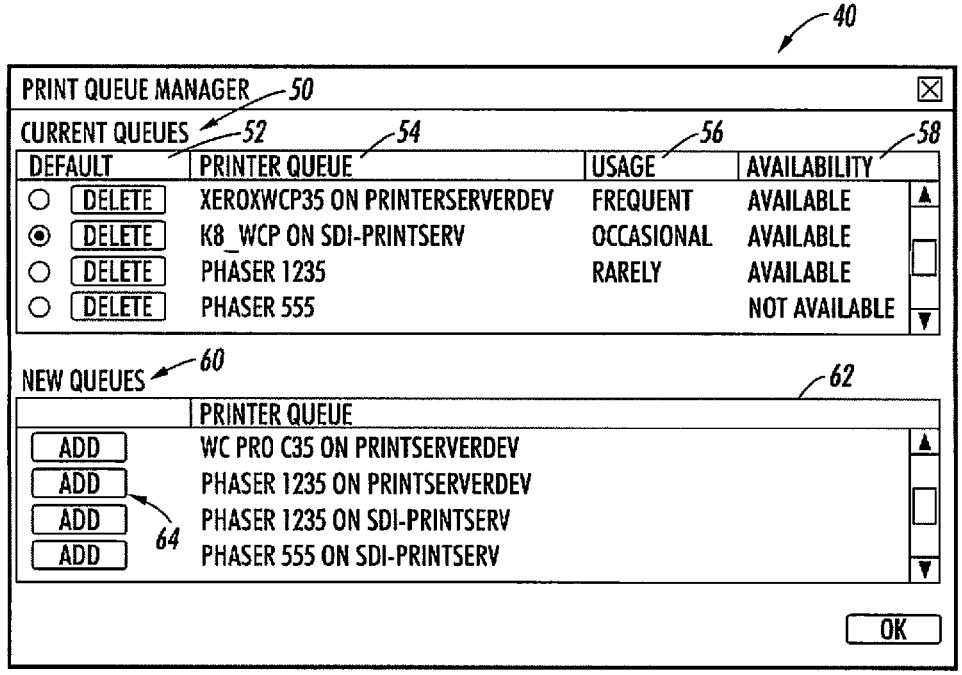
FIG. 2 is a schematic diagram of a user interface application displaying the print queue manager service, in accordance with the present disclosure.

With reference to FIG. 2, there is presented a schematic diagram of a user interface application displaying the print queue manager service, in accordance with the present disclosure. The user interface application 40 includes a current queues interface 50 and a new queues interface 60. The current queues interface 50 includes a default column 52, a printer queue column 54, a usage column 56, and an availability column 58. The new queues interface 60 includes a printer queue column 62 and "add buttons" 64.

FIG. 2 illustrates an example of how the print queue manager UI 14 and/or the default print queue manager UI 16 may appear to one or more users. The top of the user interface application 40 includes a tray icon menu (not shown) in which the print queue manager service 20 can be launched. The lower portion of the user interface application 40 illustrates how the print queue manager UI 14 and/or the default print queue manager UI 16 may appear to one or more users. The user interface application 40 further illustrates which queues 54 are frequently, occasionally, or rarely used, as well as which queue are no longer available with the aid of the usage column 56 and the availability column 58. The user can subsequently add or delete queues and set the default queue with the aid of the default column 52.

The print queue manager UI 14 and/or the default print queue manager UI 16, provide users with a view of the information that the print queue manager service 20 collects and/or maintains. The print queue manager service 20 displays currently installed printer queues and denotes which ones are still available on the network. Those which are unavailable are highlighted as prime candidates for deletion. The rarely used queues may also be good candidates for deletion to really reduce the number of wasted queues on a system.

The print queue manager UI 14 and/or the default print queue manager UI 16 further illustrate the new queues that have been discovered by the print queue manager service 20. These queues can be added to the printing system by simply selecting an "add button" 64. Additionally, the print queue manager UI 14 and/or the default print queue manager UI 16 could be launched directly by the user or automatically appear when the users log into their workstations. The print queue manager UI 14 and/or the default print queue manager UI 16 could also be configured to launch when the users log in and there are new queues available for incorporation within the printing system.

Figure 3:
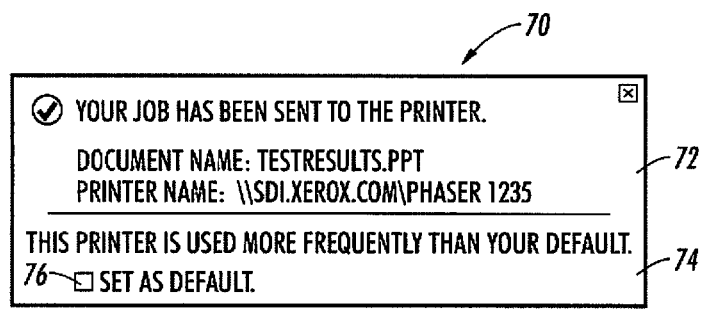
FIG. 3 is a display screen illustrating the updated status of a multifunction device (MFD) utilizing the print queue manager service, in accordance with the present disclosure.

With reference to FIG. 3, there is presented a display screen illustrating the updated status of a multifunction device (MFD) utilizing the print queue manager service, in accordance with the present disclosure. The display screen 70 includes a first display section 72, a second display section 74, and a default checkbox 76.

Part of the print queue management system 10 (see FIG. 1) is the capability to receive and display print queue notifications. FIG. 3 illustrates an example of this capability involving the print job notification. The first display section 72 informs the user that the print job has been completed. The second display section 74, which is a balloon message shown in FIG. 3, is an extension of what might typically be shown on a given computer platform when a print job is sent to a print queue. In FIG. 3, the balloon notification (i.e., the second display section 74) that a print job has completed is presented in the display screen 70 and the display screen 70 allows the user to set this queue as the default queue via the default checkbox 76.

Thus, the exemplary attribute added to the display screen 70, by the print queue management system 10, is the default checkbox 76. The display screen 70 indicates that the queue used for printing is more frequently used than the current system default print queue and allows the user to set it as the default via the default checkbox 76. These print job notifications, in most workstation platforms, can be implemented through hooking into the systems inherent print spooler system. However, one skilled in the art may contemplate any method of incorporating such print job notifications.

Figure 4:
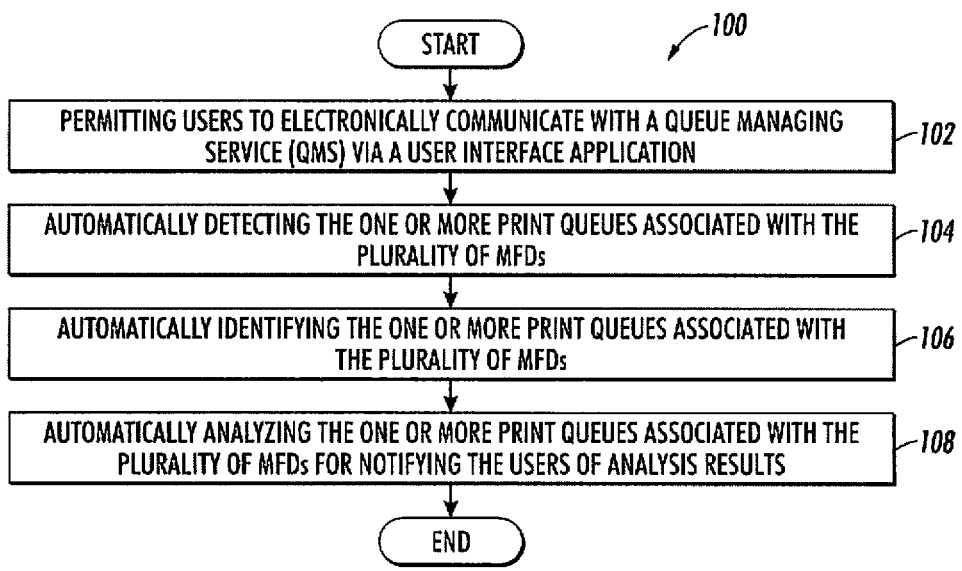
FIG. 4 is a flow chart illustrating a method for managing one or more print queues associated with a plurality of MFDs suitable for use in a printing system, in accordance with the present disclosure.

With reference to FIG. 4, there is presented a flow chart illustrating a method for managing one or more print queues associated with a plurality of MFDs suitable for use in a printing system, in accordance with the present disclosure. The flowchart 100 includes the following steps. In step 102, the users are permitted to electronically communicate with a queue managing service (QMS) via a user interface application. In step 104, the system automatically detects the one or more print queues associated with the plurality of MFDs. In step 106, the system automatically identifies the one or more print queues associated with the plurality of MFDs. In step 108, the system automatically analyzes the one or more print queues associated with the plurality of MFDs. The process then ends.

The present disclosure proposes an alternative method that takes advantage of print queue management services in order to make the process of printing simple and as streamlined as possible to provide for an efficient user experience. The concept of using a print queue management system is a general concept in that it can be used for applications other than printers by any service provider. For example, service providers could use any type of printer and/or MFD and/or electronic device to achieve the desired results of the present disclosure. Also the printing system of the present disclosure makes it easier for information technology (IT) groups and/or service providers to manage the printing environment for their clients. System administrators and/or service providers are freed up from the task of having to assist users with configuring their desktops with the appropriate print queues. The present disclosure also reduces the variety of ways in which print queues can be installed by service providers, thus causing less confusion for one or more users. As a result, the detection, identification, installation, analysis, and/or maintenance tasks of the present disclosure may be performed by any type of service provider.

A service provider can be any entity that develops, offers, controls, manages, owns, alters and/or sells software and/or hardware products. A service provider can be any entity that performs one or more tasks on one or more pre-existing MFDs, which may or may not be controlled or owned by the service provider. For example, the entity can offer a service with an existing software package and/or with any type of existing Internet-based service through the Internet. In other words, a service provider need not own or provide the MFDs. The MFDs may be owned or provided by any third party not related or associated with the service provider.

In the present disclosure, it is contemplated that the entity (such as a service provider) can offer any type of service and/or product to optimize pre-existing, pre-owned MFDs by referring potential customers to an Internet website or a store that may or may not be associated with printing-related services and/or products. The term "entity" can refer to anything that may exist as a discrete and/or distinct unit that owns, operates, manages, and/or controls one or more of a plurality of machines (such as MFDs). For example, the term "entity" may include the term "company."

The present disclosure addresses a variety of printing issues associated with conventional printing systems by providing for the automatic creation, identification, updating, installation, analysis, and/or maintenance of print queues upon detecting printing devices (such as, but not limited to, MFDs) on a network. Specifically, the present disclosure detects new printing devices connected on a network, updates old printing devices on a network, and provides updates, analysis, and maintenance information regarding any and/or all MFDs on a network. Upon detection of a printing device, information is obtained from the the detected printing device and a print queue is created. Accordingly, the present disclosure helps reduce the burden of manually creating and configuring print queues for connected printing devices by providing an efficient automated process.

The present disclosure also includes as an additional embodiment a computer-readable medium which stores programmable instructions configured for being executed by at least one processor for performing the methods described herein according to the present disclosure. The computer-readable medium can include flash memory, CD-ROM, a hard drive, etc.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A printing system comprising:
a plurality of multifunction devices (MFDs) connected to a network;
a client workstation comprising:
a print queue managing service (QMS) connected to said network; and
a user interface in communication with said QMS and comprising a display screen,
said QMS automatically monitoring said network to detect all print queues associated with said MFDs on said network,
said display screen displaying a first list of detected print queues with add buttons enabling selective installation of said detected print queues on said client workstation,
said QMS further tracking availability status and relative usage frequency of all installed print queues on said client workstation, and said display screen further displaying a second list of said installed print queues with said availability status and said relative usage frequency and with delete buttons enabling selective deletion of said installed print queues from said client workstation.

2. The system according to claim 1, said display screen further displaying an option enabling selective registering for additional desired services associated with said MFDs.

3. The system according to claim 1, said QMS further automatically performing maintenance operations related to print queues.

4. The system according to claim 3, said maintenance operations related to print queues comprising prompting said user to change a default printer based on results of said tracking of said relative usage frequency.

5. The system according to claim 1, said client workstation further comprising a print queue manager application programming interface in communication with said QMS and enabling user-development of said user interface.

6. The system according to claim 1, said display screen indicating that said relative usage frequency is any one of frequently used, occasionally used, and rarely used, when said availability status is available, and further indicating that said relative usage frequency is null, when said availability status is unavailable.

7. A print queue management method comprising:
   monitoring, by a print queue managing service (QMS) on a client workstation, a network to detect all print queues associated with multifunction devices (MFDs) connected to said network;
   displaying, by a display screen of a user interface on said client workstation, a first list of detected print queues with add buttons enabling selective installation of said detected print queues on said client workstation;
   automatically tracking, by said QMS, availability status and relative usage frequency of all installed print queues on said client workstation; and
   displaying, by said display screen, a second list of said installed print queues with said availability status and said relative usage frequency of said print queues and with delete buttons enabling selective deletion of said installed print queues from said client workstation.

8. The method according to claim 7, further comprising displaying, by said display screen, an option enabling selective registering for additional desired services associated with said MFDs.

9. The method according to claim 7, further comprising automatically performing, by said QMS, maintenance operations related to print queues.

10. The method according to claim 9, said maintenance operations related to print queues comprising prompting said user to change a default printer based on results of said tracking of said relative usage frequency.

11. The method according to claim 7, further comprising allowing said user to develop said UI using a print queue manager application programming interface on said client workstation in communication with said QMS.

12. The method according to claim 7, said display screen indicating that said relative usage frequency is any one of frequently used, occasionally used, and rarely used, when said availability status is available, and further indicating that said relative usage frequency is null, when said availability status is unavailable.

13. A non-transitory computer-readable medium storing programmable instructions configured for being executed by at least one processor to perform a print queue management method, said print queue management method comprising:
   monitoring, by a print queue managing service (QMS) on a client workstation, a network to detect all print queues associated with multifunction devices (MFDs) connected to said network;
   displaying, by a display screen of a user interface on said client workstation, a first list of detected print queues with add buttons enabling selective installation of said detected print queues on said client workstation;
   automatically tracking, by said QMS, availability status and relative usage frequency of all installed print queues on said client workstation; and
   displaying, by said display screen, a second list of said installed print queues with said availability status and said relative usage frequency and with delete buttons enabling selective deletion of said installed print queues from said client workstation.

14. The computer-readable medium according to claim 13, said method further comprising displaying, by said display screen, an option enabling selective registering for additional desired services associated with said MFDs.

15. The computer-readable medium according to claim 13, said method further comprising automatically performing maintenance operations related to print queues.

16. The computer-readable medium according to claim 13, said method further comprising allowing said user to develop said UI.

17. The computer-readable medium according to claim 13, said display screen indicating that said relative usage frequency is any one of frequently used, occasionally used, and rarely used, when said availability status is available, and further indicating that said relative usage frequency is null, when said availability status is unavailable.

* * * * *